Nov. 1, 1966     P. S. GROSS     3,281,960
EDUCATIONAL MEANS AND METHOD
Filed Jan. 15, 1963
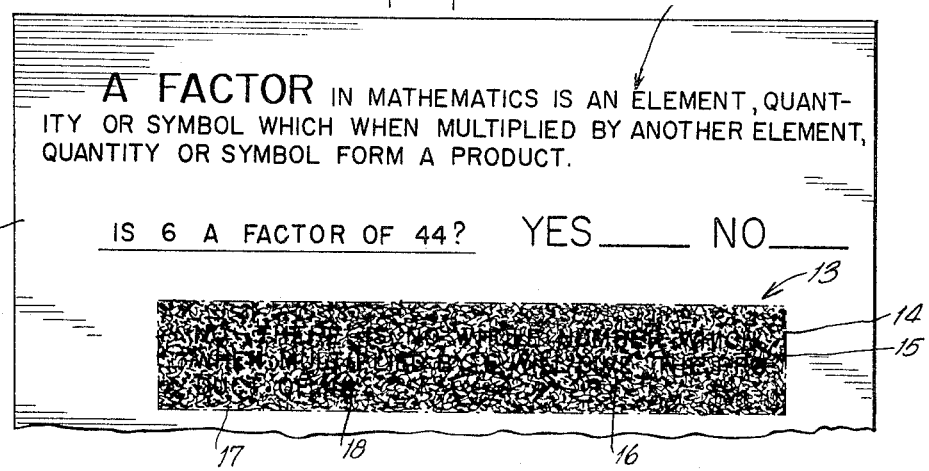
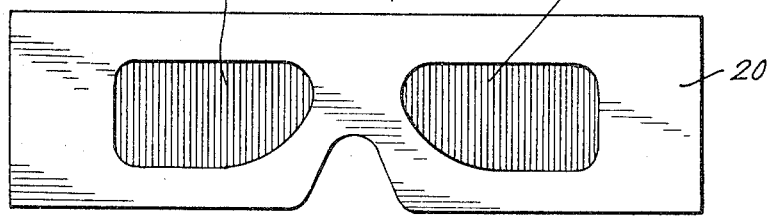
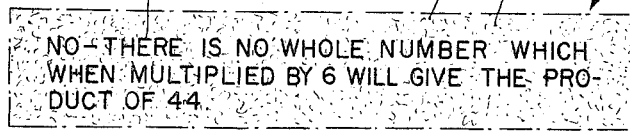
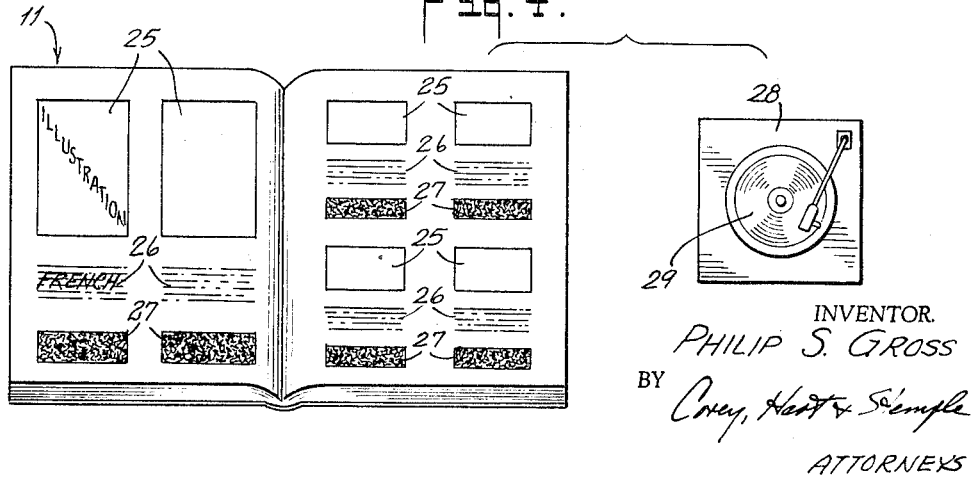
INVENTOR.
PHILIP S. GROSS
BY
*Corey, Hart & Stemple*
ATTORNEYS 3,281,960
EDUCATIONAL MEANS AND METHOD
Philip S. Gross, 609 E. 53rd St., Brooklyn, N.Y.
Filed Jan. 15, 1963, Ser. No. 251,638
3 Claims. (Cl. 35—9)

This invention relates to the learning and testing of knowledge and more specifically to an improved means for promoting the learning and ready testing of knowledge of an intellectual nature. The invention is particuraly adaptable to the learning of languages, to program and text book learning, and to questionnaires.

Conventional systems of learning depend on a great deal of memory drill and repetition which to many students are boring and discouraging. Efforts have been made to overcome the disadvantages of prior conventional methods by supplementing the latter with tutoring by phonograph records, and by employing systems which teach the student by combining a text with predetermined questions from which the answers are hidden and then disclosing the answers to the student. A system of this latter type, which has been employed in many variations to serve different purposes, in its simplest form usually gives the answers on a different page of the questionnaire than the one on which the question is posed. This is a cumbersome, tiresome procedure that takes a great deal of the student's time and has resulted in the development of costly devices for hiding the answers on the page on which the questions appear. Often also, as in the case with "true and false" or "right and wrong" questions, it has been found necessary to build special devices and machinery to check the student's answers.

The purpose of the present invention is to provide an improved method of hiding answers and explanations wherever needed on a sheet in direct association with questions, pictures or text material employed in teaching a subject or testing a student's knowledge thereof.

Another object of the invention is to provide an improved method of hiding answers and explanations which is less expensive and can be more readily utilized with less expenditure of effort and time than previously known systems of this type.

Other objects of the invention, as well as the advantages and features of novelty thereof will become apparent from the following description when read in connection with the accompanying drawings, in which FIG. 1 illustrates a portion of a page provided with text embodying the invention;

FIG. 2 shows a type of viewer which may be employed in practicing the invention;

FIG. 3 illustrates the manner in which the answer is disclosed to the student when the hidden portion of the text is observed through the viewer; and FIG. 4 illustrates the manner in which the invention may be employed for teaching languages.

The invention may be practiced utilizing one or more separate sheets, as the sheet 10 in FIG. 1 of the drawings, or a plurality of such sheets loosely or permanently bound together, or the invention may be embodied in book form as in the book 11 of FIG. 4. Essentially the invention is composed of visible text 12 which has positioned in adjacent relation thereto on the same page a printed section 13 containing the hidden text in the form of an answer or explanation. The visible text 12 may take the form, as shown in FIG. 1, of a brief or lengthy discusson of the topic to be taught, depending on the nature of the latter, and one or more questions to test the student's retention or understanding of the discussion, or such text may be simply constituted of one or more questions, or one or more paragraphs of a foreign language, or a section of a text book on mathematics, science, etc. The printed section or sections 13 may be associated with such visible text in aligned tabular form, as indicated in FIG. 1, or may be arranged in successive fashion so that printed sections follow visible sections or text without interruption.

The printed sections 13 may have any desired configuration and size and are constituted of a background 14 on which has been superposed a design 15 and printed matter 16. The background 14 is of a color which contrasts with the colors of the design 15 and the pritned matter 16. It has been found that a light contrasting color, such as white, is best suited for the purposes of the invention. The design 15 as a whole is continuous and unbroken throughout the area thereof in which is hidden the printed matter 16 and is of red color. If the design 15 is printed directly on the background, as is the case of the design 15 in FIG. 1 which is printed directly on the page 10, the red ink or paint of the design may be opaque. On the other hand, if the design 15 is printed over the printed matter 16, or is printed on a transparent plastic sheet which is to be positioned over printed matter 16 provided on the background 14, the design should be made with transparent ink of a deep red color.

The design 15 is comprised of inked or printed portions 17 of relatively wide areas and portions 18 of thinner line-like thickness. The two portions 17 and 18 of the design are of haphazard sizes and forms and are so interrelated that they form a mottled design that does not completely hide the background 14 and is clearly defined thereagainst, but which provides excellent hiding qualities for the printed matter 16 which extends over both the exposed and the design covered portions of the background 14. The hiding power of the design is great enough to render it difficult for a student's eyes to discern without the aid of the viewer 20 of FIG. 2, the characters of the printed matter 16 with sufficient clearness to read it. Without the aid of the viewer 20, the printed matter 16 appears as indistinguishable lines of different colored matter than the design 15 and may in fact seem to be part of such design in so far as the student is able to derive any intelligence from it.

The printed matter 16 is constituted of a turquoise blue or green ink which preferably is a transparent ink, but may be opaque if used with an overprinted design 15 of transparent ink, or a transparent design on a plastic sheet.

The viewer 20, as is shown in FIG. 2, may be composed of a cardboard mask-link member in which the eye openings thereof are covered with sheets 21 of red colored transparent plastic material. The sheets 21 may be constituted of any other suitable red colored, transparent material, such as red colored glass sheets or plates. It will be understood that the viewer can be made in other forms, and that the colored transparent material may be used by itself, and without any frame member, in the practice of the invention. FIG. 3 of the drawings, illustrates what is seen by the student when he scans the printed section 13 with a viewer 20. It will be noted that the red transparent sheets 21 of the viewer filters through the red design 15 so that its color is toned down to a substantial extent and the contrast thereof with the background 14 is materially reduced. The color of the sheets 21 also combines with the turquoise color of the printed matter 16 to make a distinctly darker impression that is very legible. As a result the printed matter 16 can be clearly read through the viewer.

It will be understood from the foregoing that in the practice of the invention, the student can readily read the visible text 12. He cannot however, decipher the printed matter hidden in the printed section 13. If he feels that the visible text is completely understandable and is confident that he can answer any question that may be included with such text, he may not bother to examine the printed section 13. However, if he desires aid to his understanding of the visible text, or the correct answer to the question asked, he will merely observe the printed section 13 through the viewer 20 and such information will clearly appear before his eyes. He is thus provided with a quick aid which he may or may not decide to use, and if he does it is right at hand and involves no trouble or time to use. The aid is simple and inexpensive as it merely involves providing additional printed areas in the book and very inexpensive viewers of colored plastic material.

The invention has been found to be particularly advantageous in the teaching of foreign languages. When used for this purpose it is preferred that it be combined with suitable illustrative material and audible tutoring as from a sound record. FIG. 4 illustrates what is considered to be the preferred method of practicing the invention in the teaching of a foreign language. It is preferred that the pages of the book 11 contain a series of illustrations 25 depicting successive events in a story or description which will be of interest to the student and which can be described with words commensurate with the student's ability to translate the same. Associated with the illustrations 25 are sections 26 of printed matter describing in the foreign language being taught the events depicted by such illustrations. Associated with each section 26, is a section 27 similar in construction to the above described section 13 and having hidden therein a translation of the subject matter of the associated section 26. Thus the student is given a visual understanding of the sequence of the story by the series of illustrations 25 and each illustration furnishes a lead to what is described by its associated section 26 of the foreign language. If the student is satisfied with his understanding of the description in the foreign language, he may pass on to the next illustration and its associated description in the foreign language. However, if he has any doubts as to his ability to correctly translate the foreign language in any section 26, or desires a more accurate understanding of its meaning, he will place the viewer 20 over the section 27 associated therewith and examine the explanation thus revealed, before passing on to the next illustration and its associated section 26. These aids, the illustrations and the associated hidden translations, enable the student to quickly acquire the ability to understand the structure of the foreign language and how it is used, and this without monotonous drills in memory exercises. The stories depicted by the illustrations and the language employed in describing them will be made progressively more difficult until the student is enabled to handle more sophisticated works. It is also preferred that the student read the above described text in cooperation with a record player 28 provided with a disc 29 or tape having recorded thereon the foreign language of the sections 26 in spoken form. Thus, the student, while he is reading a section 26 with the associated illustration in mind, will hear how the subject matter of such section is pronounced and arranged orally and thus attain more quickly a comprehension of the language he is trying to learn.

While I have hereinabove described and illustrated in the drawings, embodiments by which my invention may be practiced, it will be understood by those skilled in this art, that other forms and embodiments of the invention may be employed in practice without departing from the spirit of the invention or the scope of the accompanying claims.

I claim:

1. Educational means for facilitating the teaching of a subject, comprising a sheet having provided thereon visible printed text material relating to the subject being taught, and adjacently positioned on said sheet to such text material a section having hidden therein printed material corroborative of such visible text, said section being a composite of two different colored inks and constituting a mottled design in red ink disposed against a background of contrasting color and having embodied within the area thereof said corroborative material printed in a turquoise colored ink, said mottled design being of sufficient intricacy to render it difficult to interpret the corroborative material with the naked eye, said mottled design and said corroborative material being in overlying relation and both appearing to the human eye as a unitary design in which both are visible but not readily distinguishable from each other, and both being permanently mounted on such sheet to be used repeatedly as such unitary design in connection with the repeated use of said visible printed text material, and the ink of the overlying printed material in said section being a transparent ink, and a viewer for scanning said section and comprising a transparent sheet of red color such that when such section is viewed therethrough the contrast of the red ink with said background is materially reduced, and the presence of the turquoise ink of said corroborative material is enhanced so that such corroborative material can be clearly read by the reader.

2. Educational means such as defined in claim 1, in which said mottled design is printed on a white background provided on said sheet with an opaque red ink, and in which said corroborative material is printed over said background and mottled design with a transparent turquoise colored ink.

3. The method of teaching an intellectual subject which comprises printing on a sheet a visible text relating to such subject, and associating therewith in adjacently positioned relation on such sheet, a section formed of a composite of two different colored inks and constituting a mottled design in red ink and corroborative material in turquoise colored ink, the mottled design being disposed against a background of contrasting color and being of sufficient intricacy to render it difficult to interpret the corroborative material with the naked eye, the material of the mottled design and the corroborative material being in overlying relation and both appearing to the human eye as a unitary design in which both are visible but not readily distinguishable from each other, and both being permanently associated together in such unitary design as as to be used repeatedly together in connection with the repeated use of said visible text, and the ink of the overlying material in such section being a transparent ink, and providing a viewer composed of a red colored, transparent sheet, which when viewed therethrough by a reader, will materially reduce the contrast of the red ink with its background and enhance the presence of the turquoise colored ink to enable the reader to see clearly the corroborative material in said printed section.

References Cited by the Examiner

UNITED STATES PATENTS

| | | | |
|---|---|---|---|
| 1,422,527 | 7/1922 | Berger | 35–26 |
| 2,618,866 | 11/1952 | Adams | 35–9 |
| 3,055,117 | 9/1962 | Berstein et al | 35–9 |
| 3,081,088 | 3/1963 | Kast | 35–9 |
| 3,251,141 | 5/1966 | MacRae | 35–9 |

OTHER REFERENCES

"An Automated Teaching System . . .," published in September 1961 by Institute for Instructional Improvement, Inc., New York.

EUGENE R. CAPOZIO, *Primary Examiner.*

LAWRENCE CHARLES, JEROME SCHNALL,
*Examiners.*

S. M. BENDER, *Assistant Examiner.*